(12) United States Patent
Suh

(10) Patent No.: US 6,574,052 B2
(45) Date of Patent: Jun. 3, 2003

(54) OPTICAL PICK-UP ACTUATOR

(75) Inventor: Min Suk Suh, Sung Nam (KR)

(73) Assignee: LG Electronics Inc., Seoul (KR)

( * ) Notice: Subject to any disclaimer, the term of this patent is extended or adjusted under 35 U.S.C. 154(b) by 140 days.

(21) Appl. No.: 09/825,216

(22) Filed: Apr. 3, 2001

(65) Prior Publication Data

US 2001/0030815 A1 Oct. 18, 2001

(30) Foreign Application Priority Data

Apr. 3, 2000 (KR) .......................................... 2000-17363

(51) Int. Cl.⁷ ................................ G02B 7/02; G11B 7/00
(52) U.S. Cl. ...................... 359/814; 359/813; 359/822; 359/824; 369/44.15; 369/44.22
(58) Field of Search ................................. 359/811, 813, 359/814, 824, 822; 369/44.15, 44.16, 44.21, 44.22, 247

(56) References Cited

U.S. PATENT DOCUMENTS 5,313,334 A * 5/1994 Tomiyama et al. ......... 359/824
5,508,851 A * 4/1996 Tachizawa ................. 359/822

* cited by examiner

*Primary Examiner*—Loha Ben
(74) *Attorney, Agent, or Firm*—Lee & Hong

(57) ABSTRACT

An optical pick-up actuator includes a lens holder suspended in a magnetic field by a suspension wire and having tracking and focusing coils and objective lens, a magnet for generating a magnetic field crossing other magnetic field generated by a electric current along tracking and focusing coils so as to drive the objective lens in focusing and tracking directions in suspended state, a frame for supporting the lens holder by the suspension wire, a yoke for securing the frame by a shaft, pairs of tilting coils mounted at both end portion of the frame for driving the lens holder in suspended state by suspension wires by rotating the frame in a predetermined direction on the axis of the shaft, and pairs of tilting magnets arranged so as to correspondingly face the tilting coils.

13 Claims, 3 Drawing Sheets

OPTICAL PICK-UP ACTUATOR

BACKGROUND OF THE INVENTION (a) Field of the Invention

The present invention relates to an optical pick-up device, and in particular, to an optical pickup actuator capable of controlling tilt for recoding information signals on a high density optical disc and reproducing the same from a high density optical disc.

(b) Description of the Related Art

Recently, as high density optical media have been developed, various optical pick-up devices have been researched and developed for recording information signals on the optical media and/or reproducing the signals therefrom.

The optical pick-up is a core part of optical recording/reproducing device. Information recorded on an optical disc is converted into optical signals in forms of laser beams generated by a laser diode installed in the optical pick-up. The optical signals are received by a lens of an actuator in the optical pick and then converted into electrical signals by an optical element.

The optical pickup actuator moves an objective lens with a bobbin so as to maintain relative position between the objective lens and the optical disc and write information into or read the same out of the optical disc along tracks defined on the disc.

The optical pick-up actuator moves the objective lens to a required position in accordance with cooperation between magnets and coils arranged in a magnetic field formed by the magnets. The movable part is designed to be fixedly supported by a supporter (suspension wire) so as to obtain required frequency characteristics, can move in two directions, i.e., a focusing and tracking directions, perpendicular to each other, and can be driven without unnecessary distortion such as rotation and twist for reducing optical signal errors.

In this conventional optical actuator, since the objective lens secured in a lens holder is driven up and down, and left and right directions for focusing and tracking operation, a driving device utilizes the Lorentz Force by Fleming's left-hand rule using a coil arranged in a magnetic field formed by a magnet and a magnetic substance.

FIGS. 1A and 1B schematically show a conventional optical pick-up actuator. As shown in FIGS. 1A and 1B, the conventional optical pick-up actuator includes a lens holder 102 securing an objective lens 101, a magnet 103, a yoke 104, a tracking coil 105, a focusing coil 106, a plurality of wire springs 107, a fixed print circuit board (PCB) 108, and a frame 109.

The objective lens 101 is seated at a center of the lens holder 102 and the lens holder 102 is movably arranged with a plurality of wire springs 107. The lens holder 102 secures the objective lens 101 at the center thereof and is wound by the focusing coil 106, and then a previously wound tracking coils 105 are mount around the lens holder 102 over focusing coil 106. Next, the PCBs 108 is fixed on both side of the lens holder 102 and a pair of yokes 104 are arranged so as to face each other. On an outer surface of each yoke 104, a magnet 104 is fixed.

Also, the yoke 104 is integrally formed with a pick-up base and (not shown) through a hole by an integral member.

On one side of the optical pick-up actuator, a frame 109 is arranged such that a main PCB is fixed thereto using a bolt (not shown), and a plurality of wire springs are connected to the main frame 109. The wire springs 107 are connected to the fixed PCB 108 such that the lens holder 102 is suspended by the wire springs 107.

In the above structured optical pick-up actuator, if an electric current flows along the focusing coil 106, an electromotive force is generated such that the electromotive force can drive the movable part (lens holder assembly) in upward and downward directions. Identically, if the electric current flows along the tracking coil 105, an electromotive force is generated such that the electromotive force can drive the movable part in left and right directions (tracking directions).

By tracking and focusing controls of the optical pick-up actuator, the pick-up actuator maintains focusing depth of the laser beam projected from the objective lens 101 so as to read information pits on the optical disc and moves along the tracks formed on the optical disc.

However, this conventional pick-up mechanism is inappropriate for controlling the recording/reproducing operation if the data storing volume of the disc increases. The increase of storing volume means that the data recorded along each track increases such that the number of the tracks of the optical disc increase.

That is, in conventional low density optical disc, it is possible to successively read or write information signals by controlling movement of the optical pick-up and optical lens of the actuator. In the high density optical disc, however, the track width is narrow such that the conventional control method can not be used for tracking and focusing the disc.

SUMMARY OF THE INVENTION

The present invention has been made in an effort to solve the above problems of the prior art.

It is an object of the present invention to provide an optical pick-up actuator capable of controlling tilt necessary for read information signals from a high density optical disc and write the information signals on the disc.

It is another object of the present invention to provide an optical pick-up actuator capable of being driven in 5 axis directions.

To achieve the above object, the optical pick-up actuator of the present invention comprises a lens holder surrounding an objective lens, a tracking coil, and a focusing coil; a frame for suspending the lens holder in a magnetic field using a suspension wire; and a multi-axial driving magnetic circuit for driving the actuator in a third direction but not focusing and tracking directions. The optical pickup actuator of the present invention can drive the frame in a magnetic field by the multi-axial driving magnetic circuit so as to tilt the lens holder connected to the frame via the suspension wire at least in radial, tangential, and axial directions.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

An optical pick-up actuator comprises a lens holder having an objective lens and tracking and focusing coils; a frame which is connected to a predetermined fixed end portion through a shaft and has a suspension means for supporting said lens holder; and a multi-directional driving magnetic circuit for driving said lens holder in predetermined directions other than focusing and tracking directions.

An optical pick-up actuator comprises a lens holder having an objective lens and tracking and focusing coils; a frame which is connected to a predetermined fixed end portion through a shaft and has a suspension means for supporting said lens holder; and a magnetic circuit for tilting motion comprised of a coil means for tilting motion mounted at both end portion of said frame and a magnet means cooperatively provided with said coil means for tilting motion thereby bending and twisting said shaft; a magnetic circuit for axial translation comprised of a coil means for axial translation mounted at said predetermined fixed end portion and a magnet means cooperatively provided with said coil means for axial translation thereby extending and contracting said shaft.

In the present invention, wherein said multi-directional driving magnetic circuit generates a magnetic field independent from that of the magnetic circuit for tracking and focusing and drives the lens holder in the predetermined directions by driving said frame.

In the present invention, wherein said frame is driven in magnetic fields for tilt motion and axial translation through said shaft such that said lens holder is driven in predetermined directions.

In the present invention, wherein said multi-directional driving magnetic circuit is provided with pairs of coil and magnet means for generating a magnetic field such that said frame is driven in said predetermined directions according to the electric currents flowing along said coil means.

In the present invention, wherein said frame is driven in tilt motion and axial translation through said shaft.

In the present invention, wherein said shaft has bendable, twistable, and extendable/contractable characteristics.

In the present invention, wherein said shaft is made of a flexible material.

In the present invention, wherein said multi directions are radial, tangential, and axial directions.

In the present invention, wherein said predetermined fixed end portion is a yoke.

A preferred embodiment of the present invention will be described hereinafter with reference to the accompanying drawings.

Figure 1A:
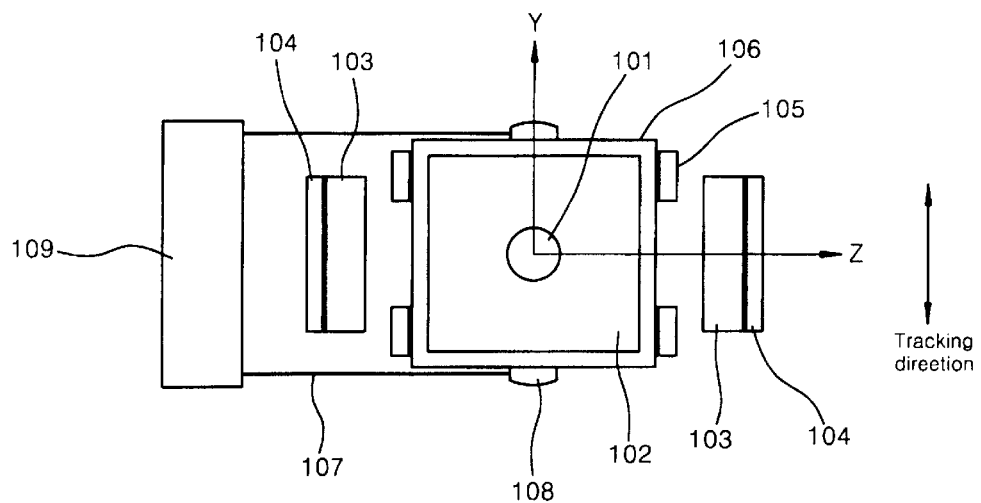
FIG. 1A is a plane view illustrating a conventional optical pick-up actuator.
Figure 1B:
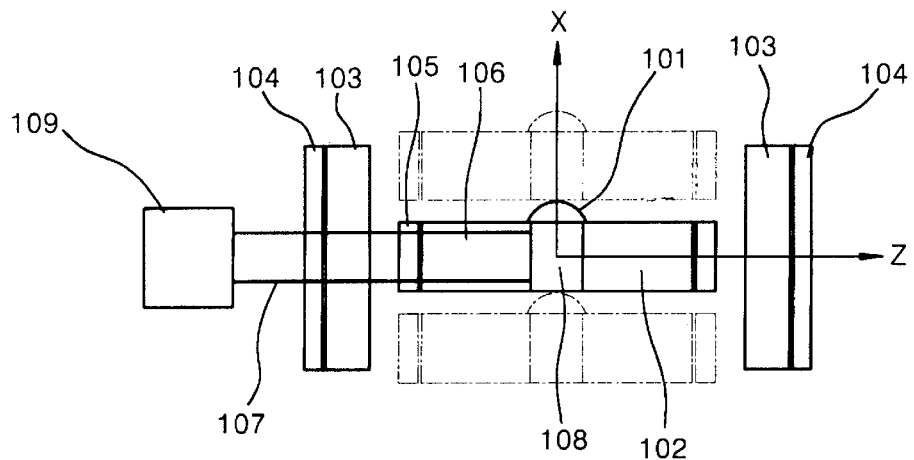
FIG. 1B is a front view of the optical pick-up actuator of FIG. 1A.
Figure 2:
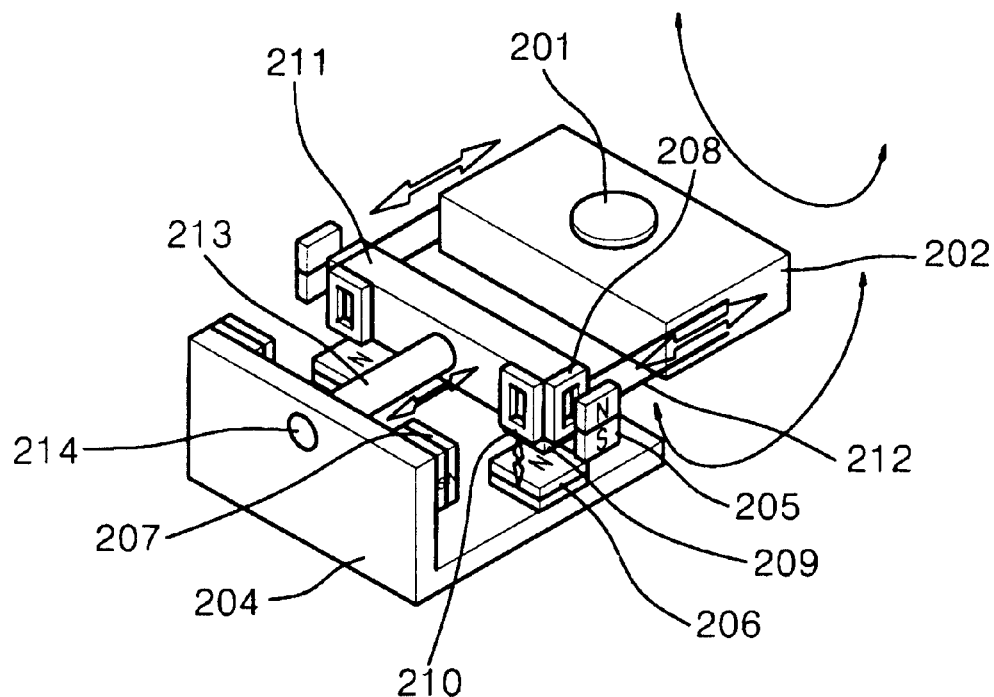
FIG. 2 is a perspective view illustrating an optical pick-up actuator according to a preferred embodiment of the present invention.
Figure 3:
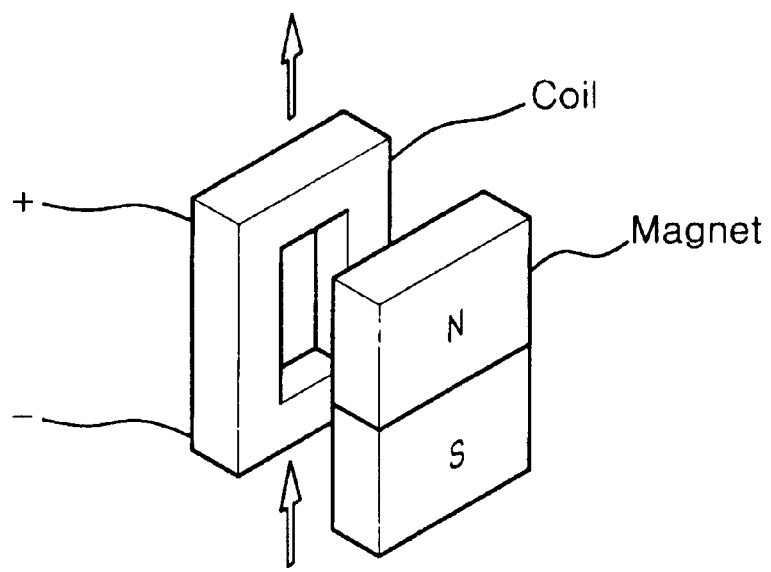
FIG. 3 is a dimensional view illustrating the Lorentz Force.

FIG. 2 shows the optical pick-up actuator of the present invention. As shown in FIG. 2, the optical actuator comprises a lens holder 202 having an objective lens 201 suspended on the frame 211 by wire springs 212, the lens holder 202 having a tracking coil and a focusing coil (not shown), a magnet (not shown) for generating for tracking and focusing magnetic fields, a yoke 204 for supporting the frame 211 via a shaft 213, the yoke 204 provided with a bearing 214 for smoothly rotating the shaft 213, coils 208, 209, and 210 mounted on the frame 211 for respectively tangential tilting and radial tilting, and axial translation, driving magnets 205, 206, and 207 arranged so as to face the coils 208, 209, and 210.

The coils 208, 209, and 210 and the magnets 205, 206, and 207 facing the coils 208, 209, and 210 forms a magnetic circuit for tilting the frame 211 in tangential, radial, and axial directions and the shaft 213 is made from a flexible material so as to be bent, twisted, extended, and contracted.

Also, the shaft 213 works as an axis of the tilt movement of the frame 211 in the tangential, radial, and axial directions and is supported by the bearing 214 for smooth rotation.

If the electric current flows along the focusing coil which locates in the magnetic field formed by the tracking and focusing magnets, the focusing coil generates electromotive force such that the electromotive force moves the movable part (lens holder assembly) in upward and downward directions (focusing directions). In the same manner, if the electric current flows along the tracking coil, the movable part moves in left and right direction (tracking direction).

The optical pick-up actuator of the present invention can drive the objective lens in five directions, i.e., the tangential, radial, and axial directions as well as the focusing and tracking directions.

A tangential tilt is performed by a cooperation of a pair of tangential tilting coils 208 mounted at both ends of the frame 211 and a pair of tangential tilting magnets 205 facing the tangential tilting coils 208, a radial tilt is achieved by a cooperation of a pair of radial tilting coils 209 mounted on a lower surface of the frame 211 at its both end portions and a pair of radial tilting magnets 206 facing the radial tilting coils 209, and an axial translation is performed by a cooperation of a pair of axial translation coils 210 mounted on a side surface of the frame 211 at its both end portions and a pair of axial translation magnets 207 facing the axial translation coils 210.

The cooperation of the coils and magnets can be explained by Lorentz Force of the Fleming's left-hand rule and the Ampere's law of clockwise screw.

The present invention utilizes this Lorentz force for tilt compensation of the optical pick-up actuator. That is, if the electric current flows along the tangential tilting coil 208 in a magnetic field formed by the tangential tilting magnet 205 facing the tangential coil 208, the tangential tilting coil 208 is effected by the Lorentz force such that the frame is driven to be rotated on the axis of the shaft 213 in the tangential direction. In this case, the frame 211 rotates in a twistable range of the shaft 213.

Figure 4:
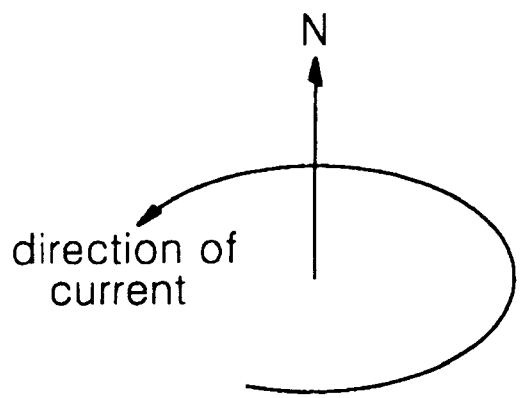
FIG. 4 is a drawing illustrating the right hand rule of Ampere.

Now, the Ampere's clockwise screw law explains how the magnetic field is formed when the electric current flows along a conductor. As shown in FIG. 4, if the current flows in clockwise direction, the magnetic field is formed so that the N pole is formed at an upper portion. By generating gravitation and repulsion forces using the magnetic field formed in this manner, it is possible to obtain a force working in a required direction.

Figure 5:
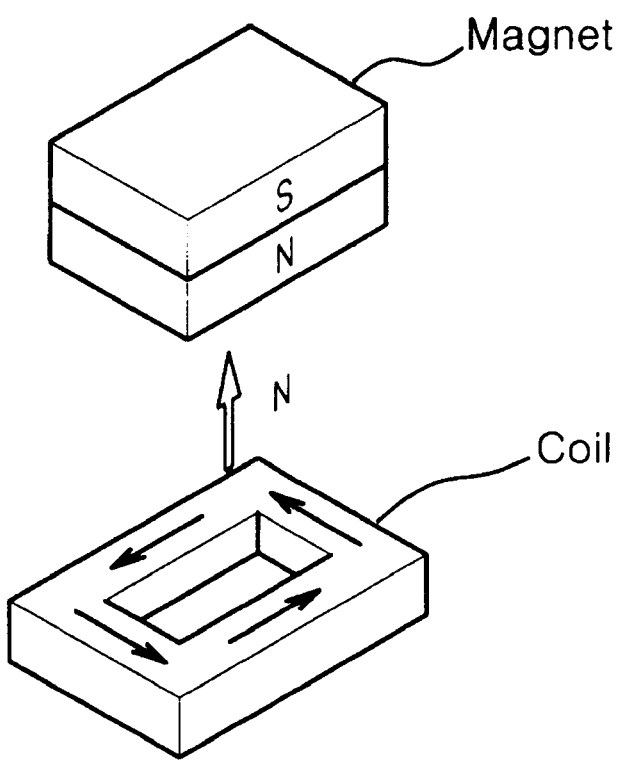
FIG. 5 is a drawing for illustrating how magnetic poles are formed in accordance with current direction regarding the right hand rule of Ampere.

FIG. 5 shows how magnetic poles are formed in accordance with current direction regarding the right hand rule of Ampere.

As shown in FIG. 5, if the electric current flows along the coil in the clockwise direction, a magnetic field is formed around the coil such that the N pole is formed in the upward direction. In the case, if a magnet is brought over the N pole area, there must be generated the gravitation or repulsion force depending on the pole of the magnet.

The present invention uses this theory for generating tilt driving force in radial direction and translation force in the axial direction.

Referring to FIG. 2 again, if the electric current flows along the radial tilting coil 209 fixed on the low surface of the frame 211 at its both end portions, the gravitation or repulsion force is generated between the radial tilting coil 209 and the radial tilting magnets 206 facing the radial tilting coil 209 such that the frame can rotate on the axis of the shaft 213 in the radial direction. The shaft 213 is made from the flexible material such that the frame can be tilted in a bendable range of the shaft 213.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An optical pick-up actuator including:
   a lens holder having an objective lens and tracking and focusing coils;
   a frame which is connected to a predetermined fixed end portion through a shaft and has a suspension means for supporting said lens holder; and
   a multi-directional driving magnetic circuit for driving said lens holder in predetermined directions other than focusing and tracking directions.

2. An optical pick-up actuator of claim 1, wherein said multi-directional driving magnetic circuit generates magnetic fields independent from those of the magnetic circuit for tracking and focusing and drives the lens holder in the predetermined directions by driving said frame.

3. An optical pick-up actuator of claim 1, wherein said frame is driven in magnetic fields for tilt motion and axial translation through said shaft such that said lens holder is driven in said predetermined directions.

4. An optical pick-up actuator of claim 1, wherein said multi-directional driving magnetic circuit is provided with pairs of coil and magnet means for generating magnetic fields such that said frame is driven in said predetermined directions according to the electric currents flowing along said coil means.

5. An optical pick-up actuator of claim 1, wherein said frame is driven in tilt motion and axial translation through said shaft.

6. An optical pick-up actuator of claim 5, wherein said shaft has bendable, twistable, and extendable/contractable characteristics.

7. An optical pick-up actuator of claim 5, wherein said shaft is made of a flexible material.

8. An Optical pick-up actuator of claim 1, wherein said multi directions are radial, tangential, and axial directions.

9. An optical pick-up actuator of claim 1, wherein said predetermined fixed end portion is a yoke.

10. An optical pick-up actuator for movement in directions other than focusing and tracking directions including:
    a lens holder having an objective lens and tracking and focusing coils;
    a frame which is connected to a predetermined fixed end portion through a shaft and has a suspension means for supporting said lens holder;
    a magnetic circuit for tilting motion comprising a coil means mounted at both end portions of said frame and a magnet means cooperatively provided with said coil means, thereby bending and twisting said shaft; and
    another magnetic circuit comprising another magnet means mounted at said predetermined fixed end portion and another coil means cooperatively provided with said other magnet means, thereby extending and contracting said shaft.

11. An optical pick-up actuator of claim 10, wherein said shaft is made of a flexible material.

12. An optical pick-up actuator of claim 10, wherein said multi-directions are radial, tangential, and axial directions.

13. An optical pick-up actuator of claim 10, wherein said predetermined fixed end portion is a yoke.

* * * * *